(12) United States Patent
Zhou et al.

(10) Patent No.: US 12,480,453 B2
(45) Date of Patent: Nov. 25, 2025

(54) AMMONIA-RICH COMBUSTION COUPLED DUAL-MODE PRECHAMBER AMMONIA-FUELED ENGINE CONTROL SYSTEM

(71) Applicant: Tianjin University, Tianjin (CN)

(72) Inventors: Lei Zhou, Tianjin (CN); Zongkuan Liu, Tianjin (CN); Lijia Zhong, Tianjin (CN); Haiqiao Wei, Tianjin (CN); Gequn Shu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/935,973

(22) Filed: Nov. 4, 2024

(65) Prior Publication Data
US 2025/0146449 A1     May 8, 2025

(30) Foreign Application Priority Data

Nov. 8, 2023   (CN) .......................... 202311476476.8

(51) Int. Cl.
| | |
|---|---|
| F02D 41/00 | (2006.01) |
| F02B 19/10 | (2006.01) |
| F02B 19/12 | (2006.01) |
| F02D 41/30 | (2006.01) |

(52) U.S. Cl.
CPC ...... *F02D 41/0027* (2013.01); *F02B 19/1085* (2013.01); *F02B 19/12* (2013.01); *F02D 41/0002* (2013.01); *F02D 41/3017* (2013.01); F02D 2250/36 (2013.01)

(58) Field of Classification Search
CPC ............. F02D 41/0027; F02D 41/0002; F02D 41/3017; F02B 19/1085; F02B 19/12
See application file for complete search history.

(56) References Cited

U.S. PATENT DOCUMENTS

| | | | | |
|---|---|---|---|---|
| 11,661,885 | B2* | 5/2023 | Zhou ....................... | F02D 41/40 |
| | | | | 123/144 |
| 11,885,259 | B1* | 1/2024 | Zhou ................... | F02D 19/0671 |
| 2011/0264355 | A1* | 10/2011 | Iwatani .................. | F02M 43/00 |
| | | | | 123/575 |
| 2023/0220809 | A1* | 7/2023 | Zhou ..................... | F02B 19/108 |
| | | | | 123/295 |

\* cited by examiner

*Primary Examiner* — Kevin A Lathers
(74) *Attorney, Agent, or Firm* — Thomas Horstemeyer, LLP

(57) ABSTRACT

An ammonia-rich combustion coupled dual-mode prechamber ammonia-fueled engine control system is provided, including an ammonia-fueled engine and an electronic control unit. The ammonia-fueled engine includes a combustion chamber, a dual-mode jet ignition device, and an ammonia injector. The dual-mode jet ignition device includes a prechamber, an air injector, and a fuel injector. When the engine operates, ammonia fuel is firstly injected into the combustion chamber by the ammonia injector to form a rich ammonia-air mixture with air in the combustion chamber. During a compression stroke of the engine, the rich ammonia-air mixture in the combustion chamber is entered into the prechamber through a jet hole. The air injector performs scavenging in the prechamber until a equivalence ratio of prechamber gas mixture is less than 1.0, and then the fuel injector injects fuel into the prechamber forming target mixture. Finally, the target mixture is ignited by the spark plug.

8 Claims, 3 Drawing Sheets

AMMONIA-RICH COMBUSTION COUPLED DUAL-MODE PRECHAMBER AMMONIA-FUELED ENGINE CONTROL SYSTEM

CROSS-REFERENCE TO RELATED APPLICATION

This patent application claims the benefit and priority of Chinese Patent Application No. 202311476476.8 filed with the China National Intellectual Property Administration on Nov. 8, 2023, the disclosure of which is incorporated by reference herein in its entirety as part of the present application.

TECHNICAL FIELD

The present disclosure belongs to the technical field of internal combustion engines, and in particular to an ammonia-rich combustion coupled dual-mode prechamber ammonia-fueled engine control system with low nitrogen oxide.

BACKGROUND

As people pay more and more attention to fuel shortage and air pollution control, alternative fuels are paid more and more attention. The use of ammonia ($NH_3$) is a promising and highly feasible technological path for carbon emission reduction. However, there are two key challenges in ammonia combustion: Firstly, the ammonia is poor in combustion characteristics, and is very difficult in ignition and stable combustion under conventional conditions. Secondly, because of its high nitrogen content, there is a risk of high NO emission in ammonia combustion. The implementation of the engineering application of ammonia combustion needs the full understanding of the characteristics of ammonia combustion and NOx emission, and the targeted research on the measures of combustion enhancement and NOx control.

In recent years, researchers have carried out a through research on ammonia combustion, trying to explore economic, simple and efficient enhancement measures for ammonia combustion and control strategies for NOx emission, and have achieved a lot of valuable research results. The enhancement of ammonia combustion mainly starts from the aspects of fuel side improvement, oxidant side adjustment and combustion conditions improvement, etc., and the enhancement measures of ammonia combustion mainly include co-combustion, partial precalcining combustion, oxygen-enriched combustion, preheating combustion and enhanced mixing. The NOx in ammonia combustion mainly comes from the nitrogen contained in the fuel itself, so the NOx control strategies mainly start from controlling the oxidation conditions of ammonia, and air classification is one of the most effective methods. Meanwhile, ammonia itself also can be used as an efficient reducing agent for NOx, and making full use of such characteristics, reasonable configuration of combination strategies according to the conditions of combustion temperature is also conducive to the effective control of NOx. However, the ammonia, when used as engine fuel, is poor in the combustion characteristics, which are specifically manifested as high spontaneous combustion temperature, slow flame propagation speed, narrow combustible range and the like, leading to the ammonia-fueled engine to face the problems such as unstable combustion, low efficiency combustion and poor performance combustion. In addition, when the combustion condition in cylinder is poor, the engine also faces the risk of increased nitrogen oxide emission and ammonia escape. Therefore, the development of an efficient and clean combustion mode is a big challenge for the ammonia-fueled engine.

SUMMARY

An objective of the present disclosure is to provide a dual-mode prechamber ammonia-fueled engine control system with low nitrogen oxide and ammonia-rich combustion. An ammonia-rich combustion coupled dual-mode prechamber device needs to be employed in the present disclosure. On one hand, ammonia fuel is injected by an ammonia injector mounted on a cylinder head of an engine, so as to form a thermodynamic environment with a fuel-air equivalence ratio greater than 1 in a combustion chamber, and ammonia itself has strong reducing effect on NOx, and excess ammonia is capable of reducing NOx to nitrogen under a condition of high combustion temperature, thus achieving low nitrogen oxide combustion. On another hand, ammonia combustion must be coupled with a dual-mode prechamber device, which is capable of removing the ammonia fuel in the prechamber. A working process of the dual-mode prechamber device is as follows: through an air injector injecting air into the prechamber device to squeeze ammonia fuel out, thus ensuring an extremely low ammonia concentration in the prechamber, and then injecting ammonia fuel or high-activity fuel to achieve stable ignition in the prechamber and form a jet flame.

The objective of the present disclosure is achieved through the following technical solutions:

An ammonia-rich combustion coupled dual-mode prechamber ammonia-fueled engine control system includes an ammonia-fueled engine, and an electronic control unit (ECU). The ammonia-fueled engine includes a combustion chamber, a dual-mode jet ignition device, and an ammonia injector. The dual-mode jet ignition device includes a prechamber, an air injector, and a fuel injector. The prechamber is communicated with the combustion chamber through a jet hole formed at a bottom of the dual-mode jet ignition device, and the ECU is configured to control gas injection volume/fuel injection volume and gas injection time/fuel injection time of the dual-mode jet ignition device and the ammonia injector.

When the engine operates, ammonia fuel is firstly injected into the combustion chamber by the ammonia injector to form a rich ammonia-air mixture with air in the combustion chamber. A thermodynamic environment with a fuel-air equivalence ratio greater than 1 is formed in the combustion chamber.

During a compression stroke of the engine, the ammonia fuel in the combustion chamber is entered into the prechamber through the jet hole. The ECU controls the air injector to inject fresh air into the prechamber to squeeze the ammonia fuel entering the prechamber out until a concentration equivalence ratio of a gas mixture in the prechamber is less than 1.0, and then controls the fuel injector to inject fuel into the prechamber. A spark plug is ignited to form a jet flame, and then the rich ammonia-air mixture in the combustion chamber is ignited to complete combustion work of the engine.

Optionally, during the compression stroke of the engine, the ammonia fuel in the combustion chamber is entered into the prechamber through the jet hole. The ECU controls the air injector to inject oxygen, instead of air, into the prechamber to expand a limit, thus further improving an ignition energy and combustion stability of the engine.

In a post-combustion stage of the engine, by means of a combustion mode with a stoichiometric fuel-air ratio, the ammonia injector injects the ammonia fuel which does not exceed 5% of the total amount of the gas mixture in the combustion chamber into the combustion chamber to reduce NOx in the combustion chamber of the engine to generate nitrogen, thus achieving low nitrogen oxide combustion. The specific injection volume of the ammonia fuel is determined according to engine types and operating conditions.

Further, the dual-mode jet ignition device is threaded to a cylinder head, and is controlled by the ECU to perform scavenging process in the prechamber.

Further, ammonia-fueled engine further includes a cylinder liner, a cylinder head, and a piston. The cylinder liner, the cylinder head and the piston enclose to form the combustion chamber. An intake end, an exhaust end, the dual-mode jet ignition device and the ammonia injector are all arranged at a top of the cylinder head. The ammonia injector is configured to inject ammonia or liquid ammonia fuel into the combustion chamber.

Compared with the prior art, the technical features in the present disclosure have beneficial effects as follows:

Due to high ignition energy, slow flame speed and other problems of the ammonia fuel, and under an ammonia-rich combustion condition, the ammonia-fueled engine is more difficult to ignition and slower in flame propagation speed, leading to unstable combustion. Therefore, the ammonia-rich combustion coupled dual-mode prechamber device of the present disclosure can maintain efficient combustion while achieving low nitrogen oxides. The ammonia itself has strong reducibility to NOx, the excess ammonia can reduce NOx to nitrogen under the condition of high combustion temperature, thus achieving low nitrogen oxide combustion.

The ammonia-rich combustion coupled dual-mode jet ignition device can perform scavenging process in the prechamber. The ammonia-rich combustion must be coupled with a dual-mode prechamber device, excess ammonia fuel is squeezed out by injecting air, then the ammonia fuel in the prechamber is scavenged to ensure the extremely low ammonia concentration in the prechamber, and then an appropriate amount of ammonia fuel or high-activity fuel is injected to achieve stable ignition in the prechamber and form a jet flame.

Figure 1:
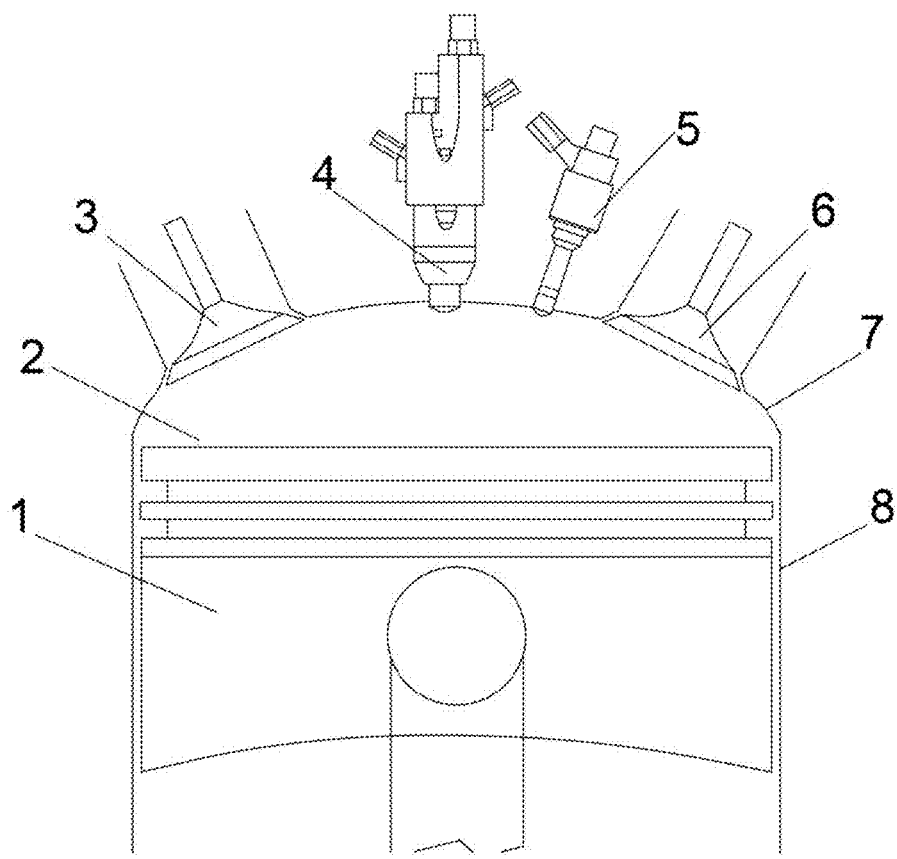
FIG. 1 is a section view of a dual-mode prechamber ammonia-fueled engine according to the present disclosure.

In the drawings:
1, piston; 2, combustion chamber; 3, intake valve; 4, dual-mode jet ignition device; 5, ammonia injector; 6, exhaust valve; 7, cylinder head; 8, cylinder liner; 9, spark plug; 10, shell; 11, air injector; 12, fuel injector; 13, prechamber; 14, jet hole; 15, jet flame; 16, ammonia-air mixture.

DETAILED DESCRIPTION OF THE EMBODIMENTS

To make the objectives, technical solutions, beneficial effects and remarkable developments of embodiments of the present disclosure more clear, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

In description of the present disclosure, the terms "first", "second" and "third" are merely used for descriptive purposes and can not be construed as indicating or implying relative importance, unless specified and limited otherwise. The term "a plurality of" refers to two or more. The terms "connection" and "fixed" should be broadly understood, unless specified or explicated otherwise. For example, "connection" may be a fixed connection, a detachable connection, an integral connection, or an electrical connection, and "connection" may also be a direct connection, or an indirect connection through an intermediary. For those skilled in the art, the specific meanings of the above terms in the present disclosure can be understood in accordance with specific conditions.

As shown in FIG. 1, an ammonia-rich combustion coupled dual-mode prechamber ammonia-fueled engine control system includes an ammonia-fueled engine, and an electronic control unit (referred to as ECU below). The ammonia-fueled engine includes a cylinder liner 8, a cylinder head 7, and a piston 1. The cylinder liner 8, the cylinder head 7 and the piston 1 enclose to form a combustion chamber 2. An intake end, an exhaust end, a dual-mode jet ignition device 4 and an ammonia injector 5 are all arranged at the top of the cylinder head 7, where the dual-mode jet ignition device 4 is centrally and vertically arranged, and a nozzle port of the ammonia injector 5 forms an acute angle with a central line of a jet hole of the dual-mode jet ignition device 4. The intake end includes an intake pipe and an intake valve 3 for introducing gas, and the exhaust end includes an exhaust pipe and an exhaust valve 6 for exhausting gas. The ammonia injector 5 is used to inject ammonia or liquid ammonia fuel into the combustion chamber 2, and the ammonia injector 5 is preferably a low-pressure liquid ammonia injector. The ECU is used to control the gas injection volume/fuel injection volume and gas injection time/fuel injection time of the dual-mode jet ignition device 4 and the ammonia injector 5.

Figure 2:
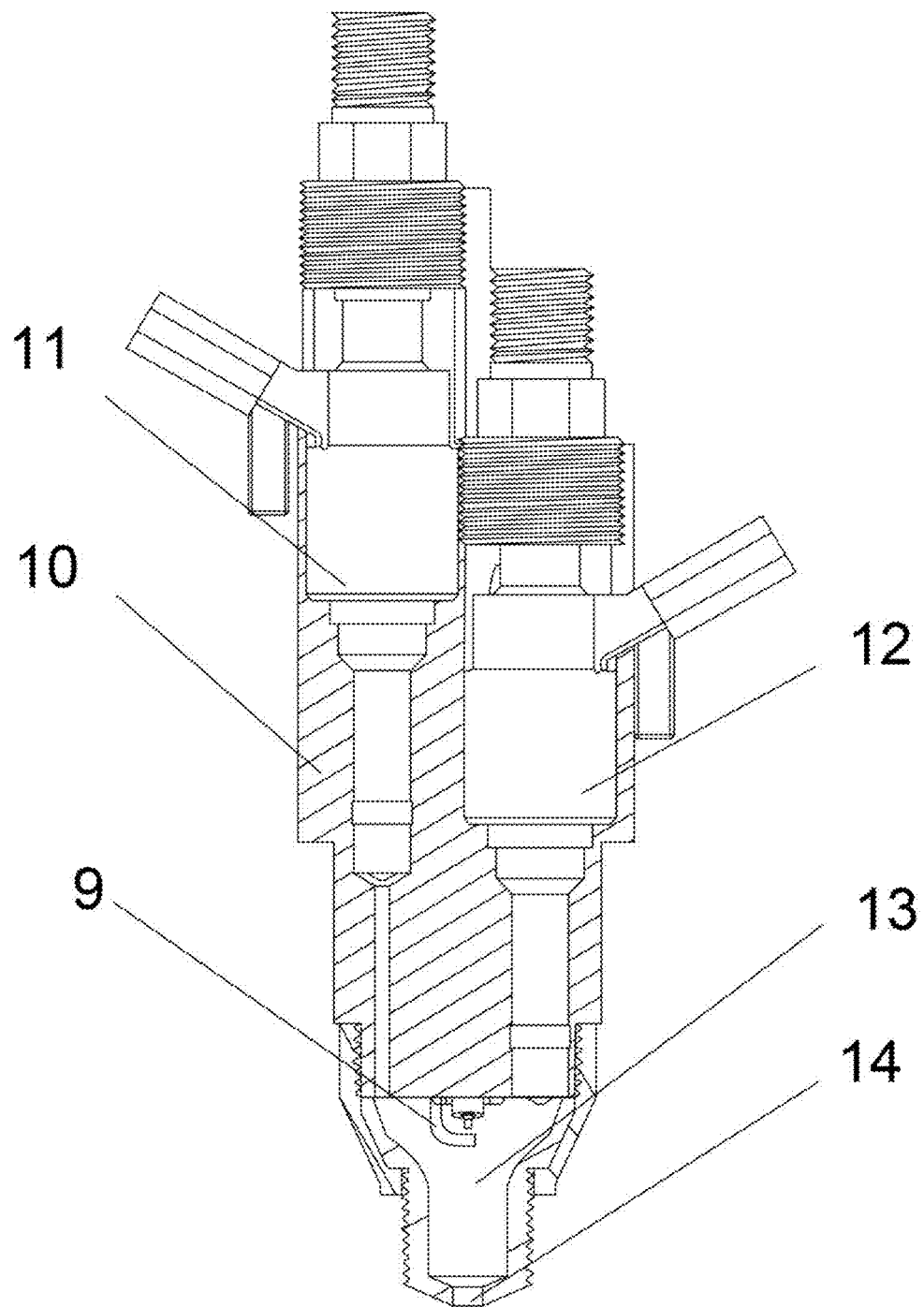
FIG. 2 is a sectional view of a dual-mode jet ignition device in FIG. 1.

As shown in FIG. 2, the dual-mode jet ignition device 4 includes a shell 10. The shell 10 is threaded to the cylinder head 7; and a spark plug 9, an air injector 11, and a fuel injector 12 are mounted in the shell 10. A prechamber 13 is arranged in the shell, and nozzle holes of the air injector 11 and the fuel injector 12 are communicated with an inner cavity of the prechamber 13; and an electrode of the spark plug 9 is located in the prechamber 13. A jet hole 14 is formed in the bottom of the prechamber 13, and the prechamber 13 is communicated with the combustion chamber 2 through the jet hole 14. The air injector 11 is used to inject fresh air into the prechamber 13, and the fuel injector 12 is used to inject fuel into the prechamber 13.

An operating process of the engine is as follows: an ammonia-rich combustion mode is employed in the engine, that is, a equivalence ratio of the fuel ammonia to the oxidant is greater than 1, i.e. as the ammonia injector 5 injects ammonia fuel into the combustion chamber 2, a thermodynamic environment with a fuel-air equivalence ratio greater than 1 is formed in the combustion chamber 2.

During the compression stroke, due to the compression of the piston 1, the ammonia in the combustion chamber 2 is entered into the prechamber 13 through the jet hole 14, and there is rich ammonia-air mixture in the combustion chamber 2, and an equivalence ratio of the rich ammonia-air mixture is greater than 1. To prevent the rich ammonia-air mixture entering the prechamber 13 from affecting the ignition process in the prechamber, the dual-mode jet ignition device 4 is used to carry out scavenging process in the prechamber to scavenge the excess ammonia fuel in the inner cavity of the prechamber 13, and the operating process of which is as follows:

Before the spark plug in the prechamber 13 ignites, the ECU controls the air injector 11 to inject fresh air into the inner cavity of the prechamber to squeeze excess ammonia fuel out, thus ensuring an extremely low ammonia concentration in the prechamber 13 and ensuring jet ignition intensity.

An oxygen concentration sensor is arranged in the prechamber to monitor an ammonia concentration (the oxygen concentration sensor is connected to the ECU). When it is detected that the concentration equivalence ratio of the gas mixture in the prechamber 13 is less than 1.0, the ECU controls the fuel injector 12 to inject fuel into the prechamber 13 to form an appropriate gas mixture concentration in the prechamber 13. The specific concentration may be determined according to the operating conditions of the engine.

Figure 3:
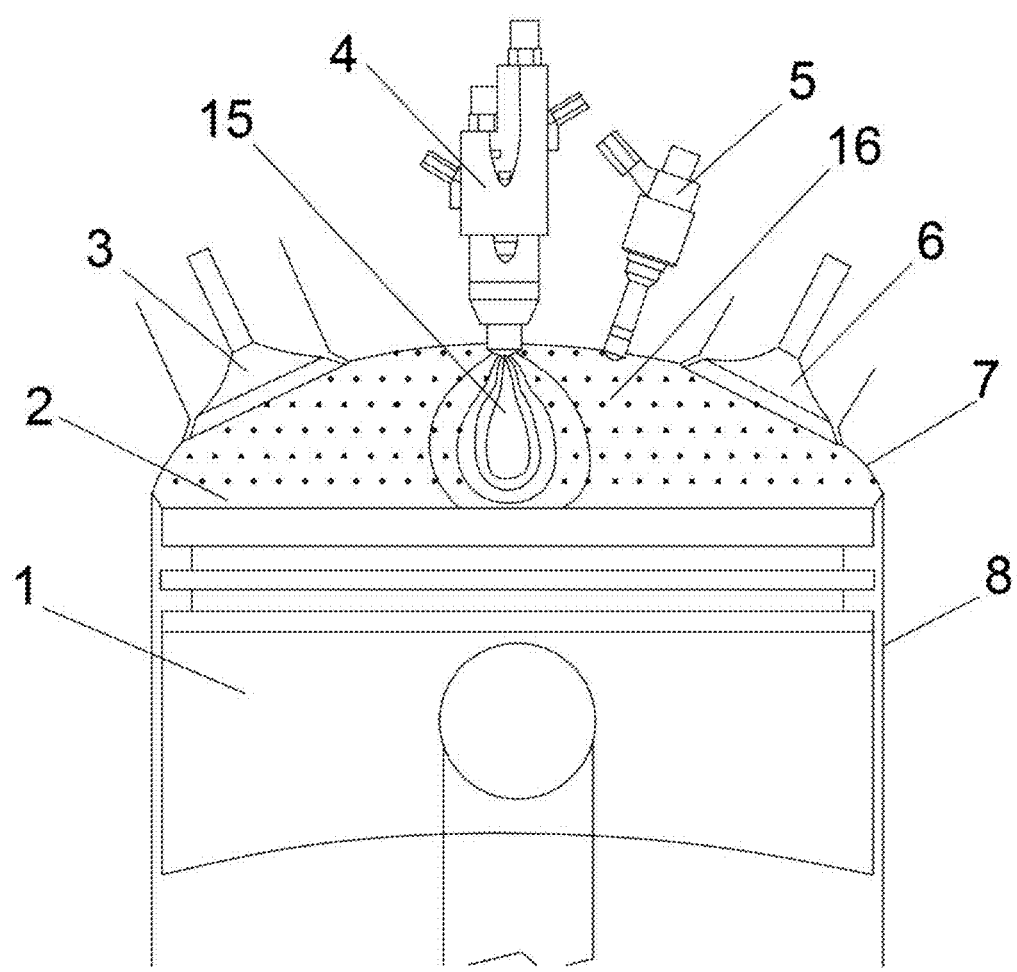
FIG. 3 is a schematic diagram of a combustion mode of in-cylinder mixture under an ammonia-rich fuel working condition in FIG. 1.

Subsequently, the spark plug 9 sparks over to ignite a target gas mixture in the prechamber 13 to form an initial flame kernel. The initial flame kernel develops in the prechamber and forms a jet flame 15 under the action of the jet hole 14 of the prechamber, and subsequently, the rich ammonia-air mixture 16 in the combustion chamber 2 is ignited to complete the combustion work of the engine (as shown in FIG. 3). Therefore, even when the ammonia in the combustion chamber 2 is supplied too rich, the stable ignition and the stability of initial flame propagation in the prechamber can also be ensured, thus igniting over-rich ammonia-air mixture 16 in the combustion chamber 2.

In a post-combustion stage of the engine, by means of a combustion mode with a stoichiometric fuel-air ratio, the ammonia injector again injects an amount of ammonia fuel which does not exceed 5% of the total amount of the gas mixture in the combustion chamber into the combustion chamber to reduce NOx in the combustion chamber of the engine to generate nitrogen. The specific injection volume of ammonia fuel is determined according to the engine types and the operating conditions. Through purification for an inner of machine, nitrogen oxides are greatly reduced, and excess ammonia can reduce NOx to nitrogen under the condition of high combustion temperature, so as to achieve low nitrogen oxide combustion and reduce NOx emission.

In addition, during the compression stroke of the engine, the ammonia fuel in the combustion chamber is entered into the prechamber through the jet hole as required. The ECU controls the air injector to inject oxygen, instead of air, into the prechamber to expand the limit, thus improving the ignition energy and combustion stability of the engine.

In addition, it should be understood that although this specification is described in terms of implementations, it does not mean that each implementation merely includes one independent technical solution. Foregoing narrative way in the specification is merely for clarity. Those skilled in the art should take this specification as a whole. The technical solutions in the embodiments may also be properly combined to form other embodiments capable of being understood by those skilled in the art.

What is claimed is:

1. An ammonia-rich combustion coupled dual-mode prechamber ammonia-fueled engine control system, comprising an ammonia-fueled engine, and an electronic control unit (ECU), wherein the ammonia-fueled engine comprises a combustion chamber (2), a dual-mode jet ignition device (4), and an ammonia injector (5); the dual-mode jet ignition device (4) comprises a prechamber (13), an air injector (11), and a fuel injector (12); the prechamber (13) is communicated with the combustion chamber (2) through a jet hole (14) formed at a bottom of the dual-mode jet ignition device (4), and the ECU is configured to control gas injection volume/fuel injection volume and gas injection time/fuel injection time of the dual-mode jet ignition device (4) and the ammonia injector (5);

when the engine operates, ammonia fuel is firstly injected into the combustion chamber (2) by the ammonia injector (5) to form a rich ammonia-air mixture with air in the combustion chamber; and a thermodynamic environment with a fuel-air equivalence ratio greater than 1 is formed in the combustion chamber (2);

during a compression stroke of the engine, the ammonia fuel in the combustion chamber (2) is entered into the prechamber (13) through the jet hole (14); the ECU controls the air injector (11) to inject fresh air into the prechamber (13) to squeeze the ammonia fuel entering the prechamber out until a concentration equivalence ratio of a gas mixture in the prechamber (13) is less than 1.0, and then controls the fuel injector (12) to inject fuel into the prechamber (13); and a spark plug is ignited to form a jet flame, and then the rich ammonia-air mixture in the combustion chamber (2) is ignited to complete combustion work of the engine.

2. The ammonia-fueled engine control system according to claim 1, wherein, optionally, during the compression stroke of the engine, the ECU controls the air injector (11) to inject oxygen into the prechamber (13) to expand a limit.

3. The ammonia-fueled engine control system according to claim 2, wherein in a post-combustion stage of the engine, by means of a combustion mode with a stoichiometric fuel-air ratio, the ammonia injector (5) injects the ammonia fuel which does not exceed 5% of the total amount of the gas mixture in the combustion chamber (2) into the combustion chamber (2) to reduce NOx in the combustion chamber of the engine to generate nitrogen, thus achieving low nitrogen oxide combustion.

4. The ammonia-fueled engine control system according to claim 2, wherein the dual-mode jet ignition device (4) is threaded to a cylinder head, and is controlled by the ECU to perform scavenging process in the prechamber.

5. The ammonia-fueled engine control system according to claim 2, wherein the ammonia-fueled engine further comprises a cylinder liner (8), a cylinder head (7), and a piston (1); the cylinder liner (8), the cylinder head (7) and the piston (1) enclose to form the combustion chamber (2); an intake end, an exhaust end, the dual-mode jet ignition device (4) and the ammonia injector (5) are all arranged at a top of the cylinder head (7); and the ammonia injector (5) is configured to inject ammonia or liquid ammonia fuel into the combustion chamber (2).

6. The ammonia-fueled engine control system according to claim 1, wherein in a post-combustion stage of the engine, by means of a combustion mode with a stoichiometric fuel-air ratio, the ammonia injector (5) injects the ammonia fuel which does not exceed 5% of the total amount of the gas mixture in the combustion chamber (2) into the combustion chamber (2) to reduce NOx in the combustion chamber of the engine to generate nitrogen, thus achieving low nitrogen oxide combustion.

7. The ammonia-fueled engine control system according to claim 1, wherein the dual-mode jet ignition device (4) is threaded to a cylinder head, and is controlled by the ECU to perform scavenging process in the prechamber.

8. The ammonia-fueled engine control system according to claim 1, wherein the ammonia-fueled engine further comprises a cylinder liner (8), a cylinder head (7), and a piston (1); the cylinder liner (8), the cylinder head (7) and the piston (1) enclose to form the combustion chamber (2); an intake end, an exhaust end, the dual-mode jet ignition device (4) and the ammonia injector (5) are all arranged at a top of the cylinder head (7); and the ammonia injector (5) is configured to inject ammonia or liquid ammonia fuel into the combustion chamber (2).

* * * * *